(12) United States Patent
Wu

(10) Patent No.: US 10,880,562 B2
(45) Date of Patent: Dec. 29, 2020

(54) IMAGE PROCESSING METHOD AND CAMERA THEREOF

(71) Applicant: VIVOTEK INC., New Taipei (TW)

(72) Inventor: Jen-Chih Wu, New Taipei (TW)

(73) Assignee: VIVOTEK INC., New Taipei (TW)

( * ) Notice: Subject to any disclaimer, the term of this patent is extended or adjusted under 35 U.S.C. 154(b) by 252 days.

(21) Appl. No.: 15/348,924

(22) Filed: Nov. 10, 2016

(65) Prior Publication Data

US 2017/0142431 A1    May 18, 2017

(30) Foreign Application Priority Data

Nov. 16, 2015  (TW) .............................. 104137691 A (51) Int. Cl.

| H04N 11/02 | (2006.01) |
|---|---|
| H04N 19/426 | (2014.01) |
| H04N 19/177 | (2014.01) |
| H04N 19/146 | (2014.01) |
| H04N 19/132 | (2014.01) |
| H04N 19/136 | (2014.01) |

(52) U.S. Cl.
CPC ......... *H04N 19/426* (2014.11); *H04N 19/132* (2014.11); *H04N 19/136* (2014.11); *H04N 19/146* (2014.11); *H04N 19/177* (2014.11)

(58) Field of Classification Search
USPC ....... 375/240.05, 240.12, 240.15; 348/394.1; 370/412; 709/217
See application file for complete search history.

(56) References Cited

U.S. PATENT DOCUMENTS

| 5,768,431 A * | 6/1998 | Saunders | H04N 19/159 |
| | | | 375/E7.03 |
| 5,835,149 A * | 11/1998 | Astle | H04N 19/172 |
| | | | 375/240.05 |
| 8,681,864 B2 * | 3/2014 | Kazui | H04N 19/105 |
| | | | 348/394.1 |
| 2005/0265369 A1 * | 12/2005 | Maeda | H04L 47/10 |
| | | | 370/412 |
| 2006/0126735 A1 * | 6/2006 | Tanaka | H04N 19/172 |
| | | | 375/240.12 |
| 2011/0246603 A1 * | 10/2011 | Lee | H04N 21/2187 |
| | | | 709/217 |
| 2015/0003530 A1 * | 1/2015 | Gao | H04N 17/004 |
| | | | 375/240.15 |

* cited by examiner

*Primary Examiner* — Jayanti K Patel
*Assistant Examiner* — Richard B Carter
(74) *Attorney, Agent, or Firm* — Winston Hsu (57) ABSTRACT

An image processing method includes receiving image data and outputting an image stream including an initial group of pictures and a next group of pictures according to the image data. The initial group of pictures includes a first initial frame and at least one first non-initial frame. The next group of pictures includes a second initial frame and at least one second non-initial frame. The image processing method further includes obtaining a first ideal frame count of the next group of pictures according to a ratio relationship of frame sizes of the first initial frame and the at least one first non-initial frame of the initial group of pictures in a predetermined frame segment or a predetermined time segment and setting a frame count of the next group of pictures according to the first ideal frame count.

13 Claims, 5 Drawing Sheets

IMAGE PROCESSING METHOD AND CAMERA THEREOF

BACKGROUND OF THE INVENTION

1. Field of the Invention

The present invention relates to an image processing method and a camera thereof, and more specifically, to an image processing method for obtaining an ideal frame count of a next group of pictures of an image stream according to a ratio relationship of frame sizes of an initial frame and at least one non-initial frame of an initial group of pictures and a camera thereof.

2. Description of the Prior Art

In general, a camera device for image surveillance (e.g. IP camera) adopts a stream transmission method to immediately transmit captured images to a control terminal (e.g. a video control host) for real-time surveillance. In practical application, for reducing the bandwidth occupied by an image stream to save the transmission time of the image stream, the image stream is usually divided into a plurality of groups of pictures (GOP) and each group of pictures is composed of one intra frame and plural predicted frames (or bi-directional predicted frame). Since the predicted frame (or bi-directional predicted frame) only keeps a part of original image data, the aforesaid frame compression method could reduce the overall data size of the image stream for generating the image compression effect.

In the aforesaid image compression method, more frame count of the predicted frame represents smaller data size of the image stream, which means it is advantageous to reduce the transmission time of the image stream. However, when the frame count of the predicted frame between the two intra frames is excessive, it may cause the problem that the quality of the image stream is low, graphical glitch occurs easily when the data package for the image stream is lost during data transmission, and the playback of the image stream is time-consuming since decoding software could not find the intra frame quickly. Although the aforesaid problem could be solved by reducing the frame count of the predicted frame (or bi-directional predicted frame) in each group of pictures, the overall data size of the image stream could be increased accordingly in this method so as to cause the transmission delay problem.

On the other hand, if there are more moving objects in the images captured by the camera device so as to cause greater variation in frame size, it is desired to make each group of pictures of the image stream have a smaller frame count so that the image stream could have a higher quality and a faster image playback speed. If there are more still objects in the images captured by the camera device so as to cause less variation in frame size, it is desired to make each group of pictures of the image stream have a larger frame count so that the overall data size of the image stream could be reduced for saving the transmission time of the image stream.

In summary, how to optimize the frame count of each group of pictures in the image stream according to the content of the image stream is one major concern of the camera device in image stream transmission.

SUMMARY OF THE INVENTION

The present invention provides an image processing method. The image processing method includes receiving image data and outputting an image stream according to the image data. The image stream includes an initial group of pictures and a next group of pictures. The initial group of pictures includes a first initial frame and at least one first non-initial frame. The next group of pictures includes a second initial frame and at least one second non-initial frame. The image processing method further includes obtaining a first ideal frame count of the next group of pictures according to a ratio relationship of frame sizes of the first initial frame and the at least one first non-initial frame of the initial group of pictures in a predetermined frame segment or a predetermined time segment and setting a frame count of the next group of pictures according to the first ideal frame count.

The present invention further provides a camera. The camera includes an image capturing unit, a processing unit, and a transmitting unit. The image capturing unit is used for capturing images of an external scene. The processing unit is connected to the image capturing unit for receiving image data and generating an image stream corresponding to the images of the external scene according to the image data. The image stream includes an initial group of pictures and a next group of pictures. The initial group of pictures includes a first initial frame and at least one first non-initial frame. The next group of pictures includes a second initial frame and at least one second non-initial frame. The processing unit is further used for obtaining a first ideal frame count of the next group of pictures according to a ratio relationship of frame sizes of the first initial frame and the at least one first non-initial frame of the initial group of pictures in a predetermined frame segment or a predetermined time segment and setting a frame count of the next group of pictures according to the first ideal frame count. The transmitting unit is connected to the processing unit for transmitting the image stream.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
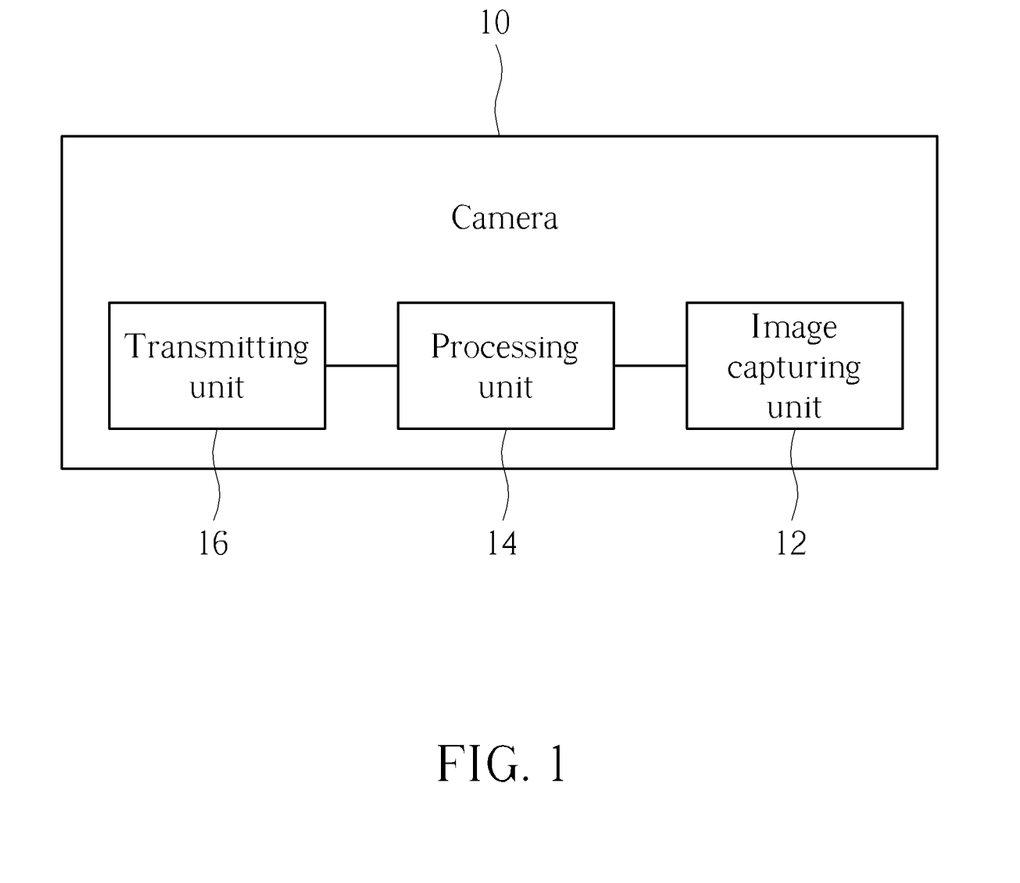
FIG. 1 is a functional block diagram of a camera according to an embodiment of the present invention.

Please refer to FIG. 1, which is a functional block diagram of a camera 10 according to an embodiment of the present invention. As shown in FIG. 1, the camera 10 includes an image capturing unit 12, a processing unit 14, and a transmitting unit 16. The image capturing unit 12 could be preferably an image sensing module (e.g. image sensor and lens) for capturing images of an external scene (e.g. parking lot). The processing unit 14 is connected to the image capturing unit 12 for generating an image stream corresponding to the images of the external scene and setting a frame count of a next group of pictures in the image stream according to an expected compression efficiency and a ratio relationship of frame sizes of an initial frame (e.g. intra frame) and at least one non-initial frame (e.g. predicted frame or bi-directional predicted frame) of one group of pictures of the image stream in a predetermined frame segment (e.g. in 30 frames) or a predetermined time segment (e.g. in 1s), so as to optimize the frame count of the next group of pictures of the image stream. The transmitting unit 16 is connected to the processing unit for transmitting the image stream in a wired or wireless transmission manner to a control terminal (e.g. a video control host), so as to achieve the real-time surveillance purpose.

Figure 2:
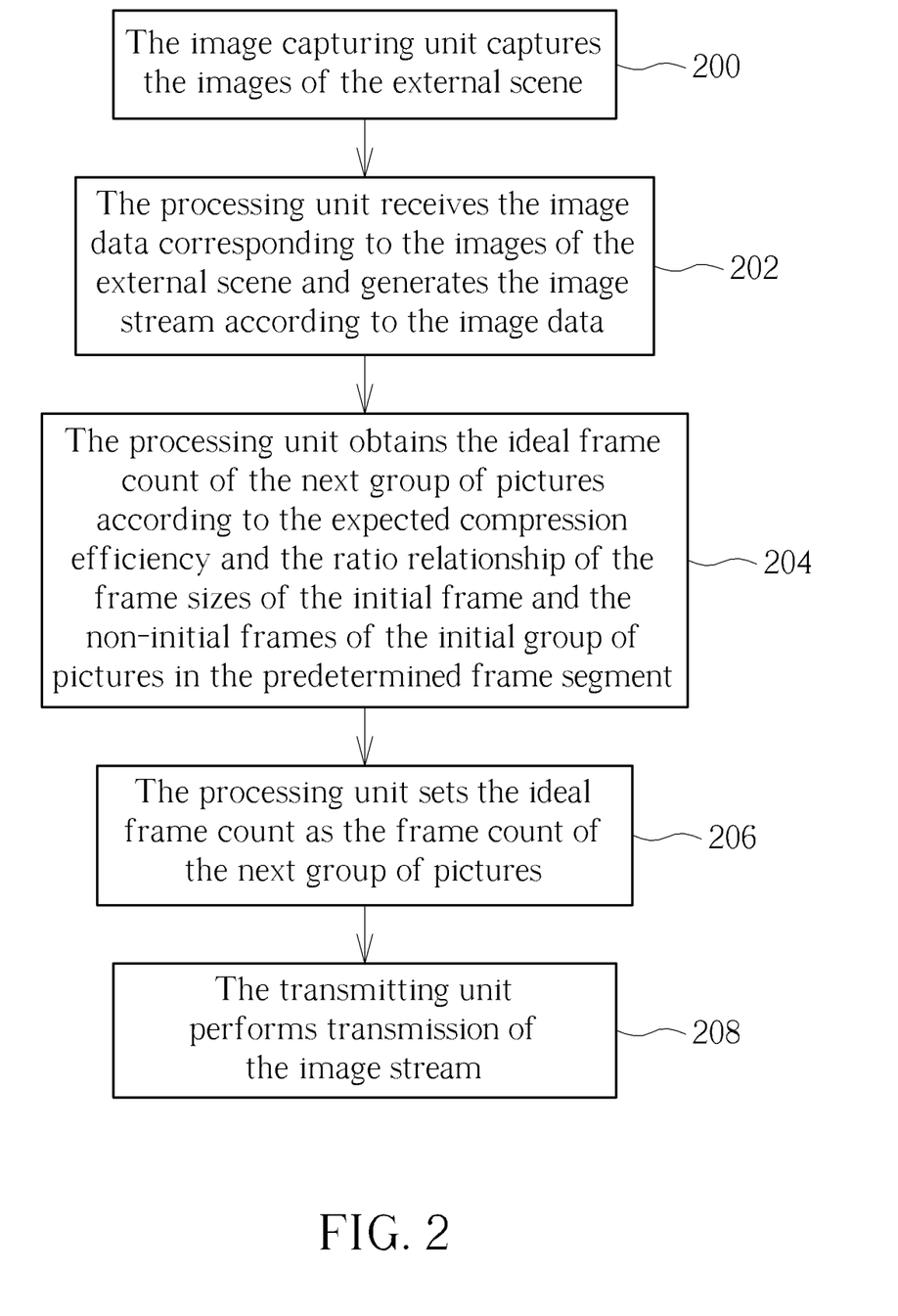
FIG. 2 is a flowchart of an image processing method according to an embodiment of the present invention.

The image processing method adopted by the camera 10 is described as follows. Please refer to FIG. 1 and FIG. 2. FIG. 2 is a flowchart of the image processing method according to an embodiment of the present invention. The image processing method of the present invention includes the following steps.

Step 200: The image capturing unit 12 captures the images of the external scene.

Step 202: The processing unit 14 receives image data corresponding to the images of the external scene and generates the image stream according to the image data.

Step 204: The processing unit 14 obtains an ideal frame count of a next group of pictures according to the expected compression efficiency and a ratio relationship of frame sizes of an initial frame and non-initial frames of an initial group of pictures in the predetermined frame segment.

Step 206: The processing unit 14 sets the ideal frame count as the frame count of the next group of pictures.

Step 208: The transmitting unit 16 performs transmission of the image stream.

More detailed description for the aforesaid steps is provided as follows. In Step 200, the camera 10 could turn on the image capturing unit 12 to capture the images of the external scene for subsequent image processing of the processing unit 14. Subsequently, the processing unit 14 could receive the image data for generating the image stream corresponding to the images captured by the image capturing unit 12 (Step 202), and could set the frame count of the next group of pictures of the image stream (Step 204). The image data could be uncoded original image data or coded image data and could be provided by an image capturing unit, a camera, the network, or other related storage device (but not limited thereto). If the image data received by the processing unit 14 is the coded image data, the processing unit 14 needs to decode the image data into the uncoded original image data in advance before generating the image stream. In this embodiment, the related description for Step 204 is provided as follows in the condition that the processing unit 14 sets the frame count of the next group of pictures (i.e. the second group of pictures of the image stream) according to the frame sizes of the initial frame and the non-initial frames of the initial group of pictures (i.e. the first group of pictures of the image stream). In Step 204, the processing unit 14 could obtain the ideal frame count of the next group of pictures according to the expected compression efficiency (could be a system default value or a user defined value) and the ratio relationship of the frame sizes of the initial frame and the non-initial frames of the initial group of pictures in the predetermined frame segment (e.g. in 30 frames, but not limited thereto, meaning that it could be a predetermined time segment (e.g. in is) in another embodiment).

To be more specific, when there are more moving objects in the images captured by the image capturing unit 12 so as to cause greater variation in frame size and a larger average frame size of the non-initial frames, the frame ratio of the frame size of the initial frame to the average frame size of the non-initial frames becomes smaller, meaning that the frame ratio and variation in frame size are reversely related to each other. Furthermore, as mentioned above, variation in frame size and the frame count of each group of pictures in the image stream could be preferably in negative correlation. In summary, the frame ratio and the frame count of each group of pictures in the image stream could be preferably in positive correlation. Thus, the processing unit 14 could preferably set the frame count of the next group of pictures of the image stream according to the frame ratio of the frame size of the initial frame to the average frame size of the non-initial frames of the initial group of pictures. To be more specific, according to the practical experience and the related formula derivation, the processing unit 14 could preferably obtain the ideal frame count of the next group of pictures of the image stream according to the following formula.

$$I_{GOP}=E(IP_{ratio}-1)/(1-E);$$

wherein $I_{GOP}$ represents the ideal frame count, E represents the expected compression efficiency (0<E<1), and $IP_{ratio}$ represents the frame ratio of the frame size $S_i$ of the initial frame to the average frame size $S_p$ of the non-initial frames of the initial group of pictures (i.e. $S_i/S_p$).

For example, in the condition that the frame rate (frame per second, FPS) of the image stream is 30 FPS, the expected compression efficiency is set as 0.9, the initial group of pictures is composed of one intra frame and twenty-nine predicted frames, the frame ratio of the frame size $S_i$ of the intra frame to the average frame size $S_p$ of the twenty-nine predicted frames is equal to 10, the processing unit 14 could calculate the ideal frame count of the next group of pictures of the image stream as 81 according to the aforesaid formula, and then could set the frame count of the next group of pictures as 81 (Step 206). In such a manner, the transmitting unit 16 could transmit the initial group of pictures and the next group of pictures as the initial group of pictures is composed of one intra frame and twenty-nine predicted frames and the next group of pictures is composed of one intra frame and eighty predicted frames (Step 208), so as to optimize the frame count of the next group of the pictures in the image stream according to the content of the image stream. Thus, the present invention could achieve the purpose that the camera 10 could transmit the image stream at the expected compression efficiency as the frame counts of the groups of pictures in the image stream are set to the ideal frame counts corresponding to variation in frame size. As for the related description for setting of the ideal frame count of other subsequent group of pictures in the image stream (e.g. setting the ideal frame count of the third group of pictures in the image stream according to frame sizes of an initial frame and at least one non-initial frames of the second group of pictures in the image stream), it could be reasoned by analogy according to the aforesaid embodiment and omitted herein.

To be noted, obtaining of the ideal frame count is not limited to the aforesaid embodiment. For example, in another embodiment, the present invention could adopt the design that the ideal frame count $I_{gop}$ is directly obtained by looking up a predetermined table (preset by the practical experience) of the frame ratio $IP_{ratio}$ and the ideal frame count $I_{gop}$ without the aforesaid calculation process, so as to enhance the calculation efficiency of the processing unit 14 in obtaining the ideal frame count $I_{gop}$. The predetermined table of the frame ratio $IP_{ratio}$ and the ideal frame count $I_{gop}$ could be as shown in Table 1, but not limited thereto.

TABLE 1

| $IP_{ratio}$ | $I_{GOP}$ |
|---|---|
| $0 \leq IP_{ratio} < 5$ | 30 |
| $5 \leq IP_{ratio} < 8$ | 60 |
| $8 \leq IP_{ratio} < 11$ | 90 |

Furthermore, for preventing frequent change of the ideal frame count $I_{GOP}$ when the frame ratio $IP_{ratio}$ varies at the boundary of the ratio segment (e.g. the ideal frame count $I_{GOP}$ varies between 30 and 60 as the frame ratio $IP_{ratio}$ varies between 4.9 and 5.1), the processing unit 14 could update the ideal frame count $I_{GOP}$ only when determining the frame ratio $IP_{ratio}$ continuously steps across more than two levels of variation. For this reason, the present invention could further subdivide the ratio segments as shown in Table 1 into the ratio segments as shown in Table 2 (but not limited thereto).

TABLE 2

| $IP_{ratio}$ | $I_{GOP}$ |
|---|---|
| $0 \leq IP_{ratio} < 3$ | 15 |
| $3 \leq IP_{ratio} < 5$ | 30 |
| $5 \leq IP_{ratio} < 7$ | 45 |
| $7 \leq IP_{ratio} < 8$ | 60 |

That is to say, assuming that the processing unit 14 calculates the current frame ratio $IP_{ratio}$ as 4.9, the processing unit 14 could obtain the ideal frame count $I_{GOP}$ as 30 according to Table 2. After calculation of the next thirty frames, assuming that the processing unit 14 calculates the next frame ratio $IP_{ratio}$ as 5.1, the processing unit 14 could obtain the ideal frame count $I_{GOP}$ as 45 according to Table 2. At this time, since the ideal frame count $I_{GOP}$ only steps across one level of variation, the processing unit 14 does not update the ideal frame count $I_{GOP}$ meaning that the ideal frame count $I_{GOP}$ is still set as 30. Subsequently, after calculation of further next thirty frames, assuming that the processing unit 14 calculates the further next frame ratio $IP_{ratio}$ as 7.1, the processing unit 14 could obtain the ideal frame count $I_{GOP}$ as 60 according to Table 2. At this time, since the ideal frame count $I_{GOP}$ has stepped across two levels of variation, the processing unit 14 updates the ideal frame count $I_{GOP}$ as 60.

Moreover, the processing unit 14 could further adopt the design that the ideal frame count is directly set as a maximum value of the frame segment when the ideal frame count is within the frame segment (could be a system default segment or a user defined segment), for preventing frequent change of the ideal frame count. For example, if the ideal frame count of the third, fourth, fifth, and sixth groups of pictures are obtained as 10, 25, 35, and 55 respectively, the first frame segment is 0~30, and the second frame segment is 30~60, the processing unit 14 could set the frame counts of the third, fourth, fifth, and sixth groups of pictures as 30, 30, 60, and 60 respectively.

Figure 3:
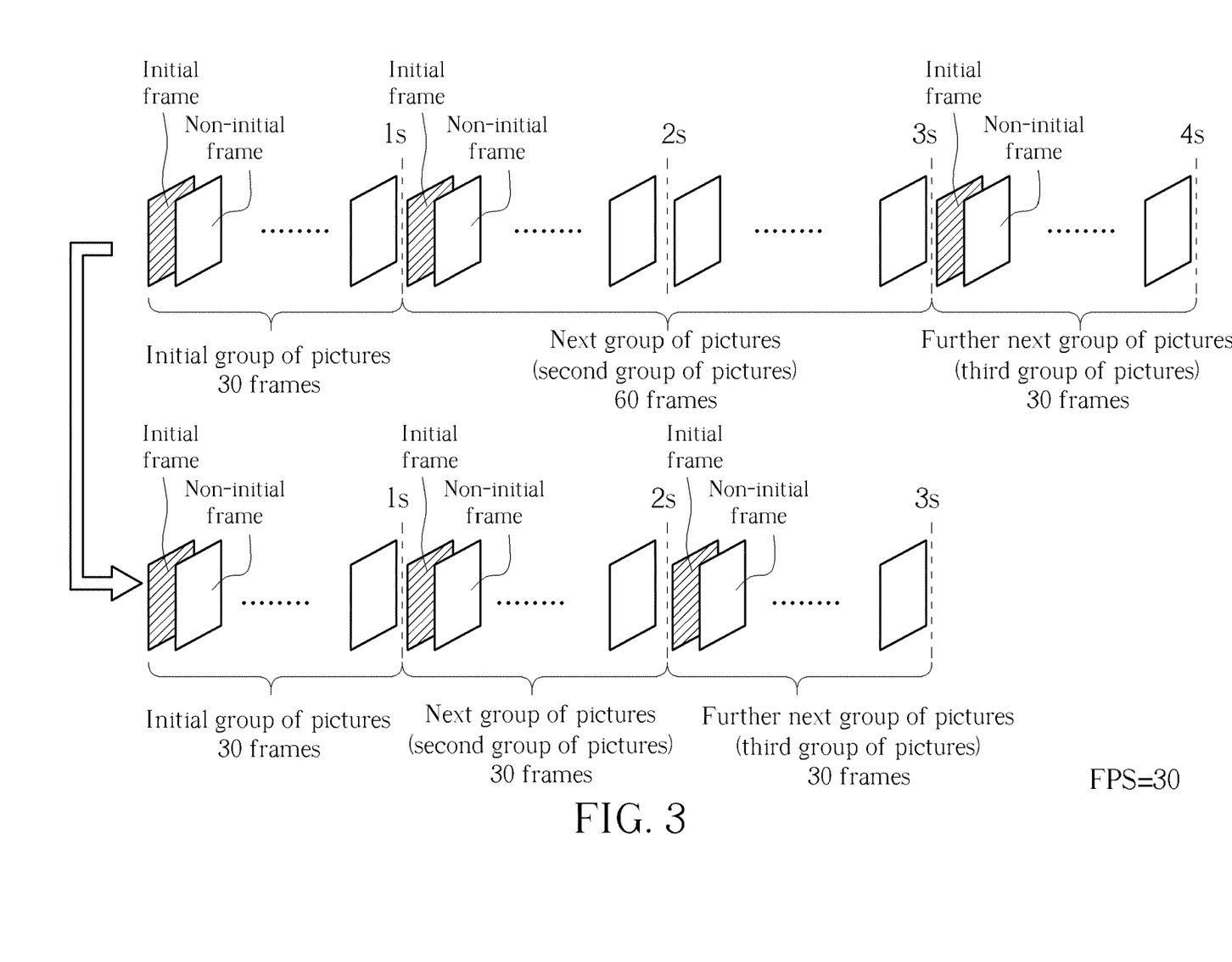
FIG. 3 is a diagram of stopping generating non-initial frames of a next group of pictures and directly generating an initial frame and non-initial frames of a further next group of pictures.

For making update of the frame count of one group of pictures in the image stream more smooth and further conform to the content of the image stream in real time (e.g. the one group of pictures could have a low frame count when variation in frame size is large, or could have a high frame count when variation in frame size is small), the processing unit 14 could set the frame count of the one group of pictures according to a comparison result of the obtained ideal frame counts of the one group of pictures and the next group of pictures. For example, if the ideal frame count of the second group of pictures (e.g. next group of pictures) of the image stream is equal to 60 and the ideal frame count of the third group of pictures (e.g. further next group of pictures) of the image stream is less than 60 (e.g. 30), meaning that variation in frame size is gradually increasing (it represents that there are more moving objects in the third group of pictures than the second group of pictures), the processing unit 14 stops generating the non-initial frames for the second group of pictures and then directly generates the initial frame and the non-initial frames for the third group of pictures. That is to say, the processing unit 14 sets the frame count of the third group of pictures as 30 and directly generates one initial frame and twenty-nine non-initial frames for the third group of pictures after stopping generating the non-initial frames for the second group of pictures (as shown in FIG. 3). Accordingly, the image playback speed and quality of the image stream could be improved in real time.

Figure 4:
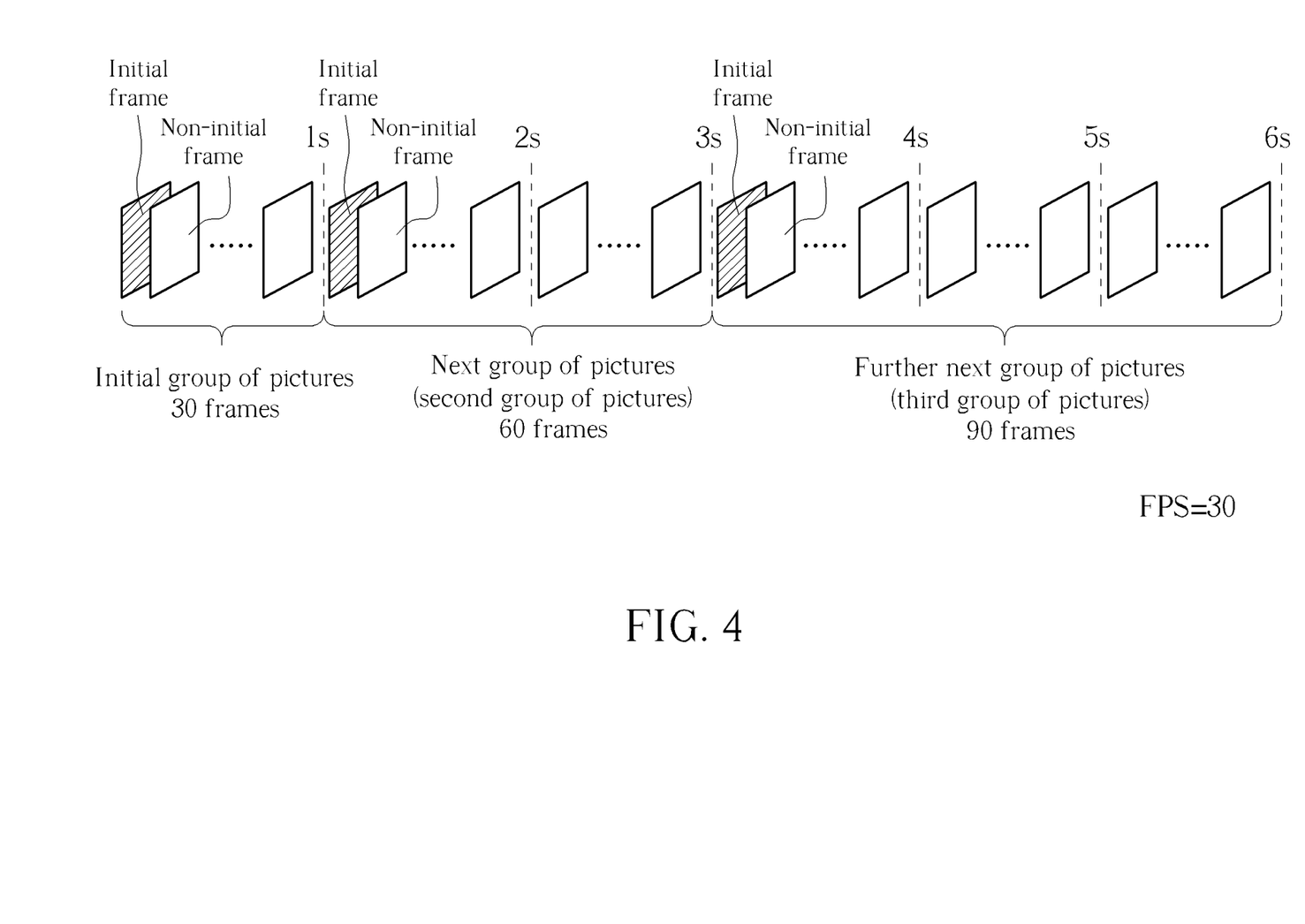
FIG. 4 is a diagram of generating the initial frame and the non-initial frames of the further next group of pictures after generating an initial frame and the non-initial frames of the next group of pictures.
Figure 5:
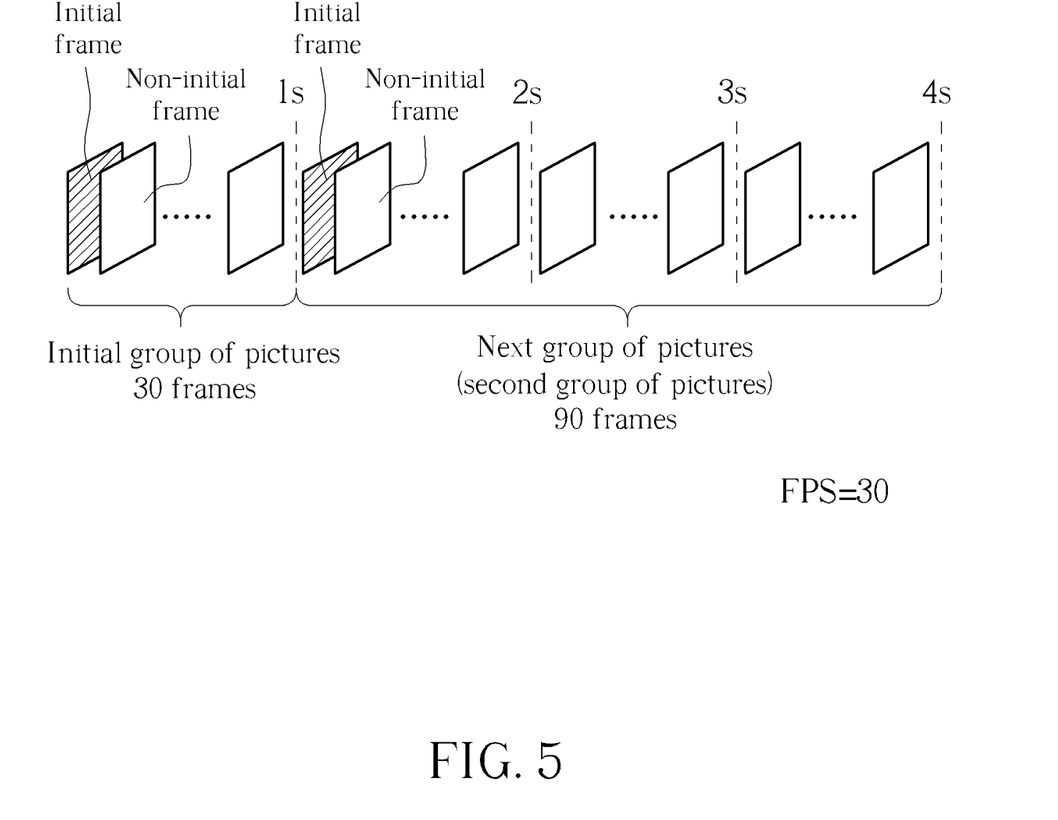
FIG. 5 is a diagram of setting a frame count of the next group of pictures according to an ideal frame count of the further next group of pictures.

On the other hand, if the ideal frame count of the second group of pictures of the image stream is equal to 60 and the ideal frame count of the third group of pictures of the image stream is larger than 60 (e.g. 90), meaning that variation in frame size is gradually decreasing (it represents that there are more still objects in the third group of pictures than the second group of pictures), the processing unit 14 sets the frame count of the third group of pictures as 90 and then generates one initial frame and eighty-nine non-initial frames for the third group of pictures (as shown in FIG. 4) after generating one initial frame and fifty-nine non-initial frames for the second group of pictures. In another embodiment, the processing unit 14 could directly set the frame count of the second group of pictures as 90 (as shown in FIG. 5), so as to reduce the overall data size of the image stream in real time for saving the transmission time of the image stream.

To be noted, the aforesaid design could be further applied to the subsequent groups of pictures in the image stream. That is, the processing unit 14 could obtain an ideal frame count of a subsequent group of pictures according to a ratio relationship of frame sizes of an initial frame and at least one non-initial frame of a current group of pictures in a predetermined frame segment (e.g. in 30 frames) or in a predetermined time segment (e.g. in 1s). Subsequently, the processing unit 14 could update the frame counts of the current and subsequent groups of pictures according to a comparison result of the ideal frame counts of the current and subsequent groups of pictures, so as to ensure that update of the frame counts of the current and subsequent groups of pictures could be more smooth and could surely conform to the content of the image stream in real time. As for other related description, it could be reasoned by analogy according to the aforesaid embodiments and omitted herein.

In summary, the present invention adopts the image processing method for optimizing the frame count of the group of pictures according to the content of the image stream, so as to achieve the purpose that the group of pictures could have a low frame count if variation in frame size is large or could have a high frame count if variation in frame size is small. In such a manner, the present invention could generate the inventive effect that the camera could transmit the image stream at the expected compression efficiency as the frame count of the group of pictures in the image stream is set to the ideal frame count corresponding to variation in frame size.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing method comprising:
   an image capturing unit receiving image data;
   outputting an image stream according to the image data, the image stream comprising an initial group of pictures and a next group of pictures, the initial group of pictures comprising a first initial frame and at least one first non-initial frame, the next group of pictures comprising a second initial frame and at least one second non-initial frame;
   a processing unit calculating a first ideal frame count of the next group of pictures according to a formula: $I_{GOP}=E(IP_{ratio}-1)/(1-E)$, $0<E<1$, wherein $I_{GOP}$ represents the first ideal frame count, E represents an expected compression efficiency of the image stream, and $IP_{ratio}$ represents a frame ratio of a frame size of the first initial frame to an average frame size of the at least one first non-initial frame of the initial group of pictures;
   the processing unit setting the first ideal frame count as a frame count of the next group of pictures; and
   a transmitting unit transmitting the image stream having the initial group of pictures with the first initial frame and at least one first non-initial frame and the next group of pictures with the first ideal frame count.

2. The image processing method of claim 1, wherein the image stream further comprises a further next group of pictures, the further next group of pictures comprises a third initial frame and at least one third non-initial frame, and the image processing method comprising:
   obtaining a second ideal frame count of the further next group of pictures according to a ratio relationship of frame sizes of the second initial frame and the at least one second non-initial frame of the next group of pictures in the predetermined frame segment or the predetermined time segment;
   wherein when the first ideal frame count is larger than the second ideal frame count, stop outputting the at least one second non-initial frame, set a frame count of the further next group of pictures according to the second ideal frame count, and output the third initial frame and the at least one third non-initial frame according to the frame count of the further next group of pictures.

3. The image processing method of claim 2, wherein when the first ideal frame count is less than or equal to the second ideal frame count, the image processing method further comprises:
   setting a frame count of the next group of pictures according to the first ideal frame count; and
   setting a frame count of the further next group of pictures according to the second ideal frame count.

4. The image processing method of claim 2, wherein when the first ideal frame count is less than or equal to the second ideal frame count, the image processing method further comprises:
   replacing the first ideal frame count with the second ideal frame count; and
   setting a frame count of the next group of pictures according to the second ideal frame count.

5. The image processing method of claim 1, wherein when the first ideal frame count is within a frame segment, set a maximum value of the frame segment as the first ideal frame count.

6. The image processing method of claim 1 further comprising:
   obtaining the first ideal frame count according to an expected compression efficiency and the ratio relationship.

7. The image processing method of claim 1, wherein the image data is uncoded original image data.

8. A camera comprising:
   an image capturing unit for capturing images of an external scene;
   a processing unit connected to the image capturing unit for receiving an image data and generating an image stream corresponding to the images of the external scene according to the image data, the image stream comprising an initial group of pictures and a next group of pictures, the initial group of pictures comprising a first initial frame and at least one first non-initial frame, the next group of pictures comprising a second initial frame and at least one second non-initial frame, the processing unit being further used for calculating a first ideal frame count of the next group of pictures and setting the first ideal frame count as a frame count of the next group of pictures, the processing unit calculating the first ideal frame count according to a formula: $I_{GOP}=E(IP_{ratio}-1)/(1-E)$, $0<E<1$, wherein $I_{GOP}$ represents the first ideal frame count, E represents an expected compression efficiency of the image stream, and $IP_{ratio}$ represents a frame ratio of a frame size of the first initial frame to an average frame size of the at least one first non-initial frame of the initial group of pictures; and
   a transmitting unit connected to the processing unit for transmitting the image stream having the initial group of pictures with the first initial frame and at least one first non-initial frame and the next group of pictures with the first ideal frame count.

9. The camera of claim 8, wherein the image stream further comprises a further next group of pictures, the further next group of pictures comprises a third initial frame and at least one third non-initial frame, and the processing unit is further used for obtaining a second ideal frame count of the further next group of pictures according to a ratio relationship of frame sizes of the second initial frame and the at least one second non-initial frame of the next group of pictures in the predetermined frame segment or the predetermined time segment;
   wherein when the first ideal frame count is larger than the second ideal frame count, the processing unit stops outputting the at least one second non-initial frame, sets a frame count of the further next group of pictures according to the second ideal frame count, and outputs the third initial frame and the at least one third non-initial frame according to the frame count of the further next group of pictures.

10. The camera of claim 9, wherein when the first ideal frame count is less than or equal to the second ideal frame count, the processing unit sets a frame count of the next group of pictures according to the first ideal frame count and sets a frame count of the further next group of pictures according to the second ideal frame count.

11. The camera of claim 9, wherein when the first ideal frame count is less than or equal to the second ideal frame count, the processing unit replaces the first ideal frame count with the second ideal frame count and sets a frame count of the next group of pictures according to the second ideal frame count.

12. The camera of claim 8, wherein when the first ideal frame count is within a frame segment, the processing unit sets a maximum value of the frame segment as the first ideal frame count.

13. The camera of claim 8, wherein the processing unit is further used for obtaining the first ideal frame count according to an expected compression efficiency and the ratio relationship.

* * * * *